United States Patent
Park

(10) Patent No.: US 8,652,551 B2
(45) Date of Patent: Feb. 18, 2014

(54) METHOD FOR PREPARING LOW-FAT ICE CREAM AND A LOW-FAT ICE CREAM PREPARED BY THE METHOD

(76) Inventor: Sang-Hong Park, Busan (KR)

( * ) Notice: Subject to any disclaimer, the term of this patent is extended or adjusted under 35 U.S.C. 154(b) by 0 days.

(21) Appl. No.: 13/030,782

(22) Filed: Feb. 18, 2011

(65) Prior Publication Data

US 2011/0236553 A1   Sep. 29, 2011

Related U.S. Application Data

(63) Continuation of application No. PCT/KR2009/004680, filed on Aug. 21, 2009.

(30) Foreign Application Priority Data

Aug. 25, 2008  (KR) .......... 10-2008-0083080
Aug. 19, 2009  (KR) .......... 10-2009-0076507

(51) Int. Cl.
 *A23G 9/00*   (2006.01)
 *A23G 9/42*   (2006.01)

(52) U.S. Cl.
 USPC .......... 426/100; 426/565

(58) Field of Classification Search
 USPC .......... 426/100, 101, 565
 See application file for complete search history.

(56) References Cited

U.S. PATENT DOCUMENTS 3,432,309 A * 3/1969 Lawrence et al. .......... 426/461

FOREIGN PATENT DOCUMENTS

| EP | 480665 A | * | 4/1992 |
| JP | 7-170914 | | 7/1995 |
| JP | 7-203860 | | 8/1995 |
| JP | 2002-272382 | | 9/2002 |
| KR | 10-0796444 | | 1/2008 |

* cited by examiner

*Primary Examiner* — Jyoti Chawla
(74) *Attorney, Agent, or Firm* — Jordan and Hamburg LLP

(57) ABSTRACT

Provided is a method for preparing a low-fat ice cream, including: mixing 100 parts by weight of boiled rice obtained by gelatinizing rice, drying the gelatinized rice to a water content of 20 wt % or less and pulverizing the dried rice to an average particle diameter of 320 to 350 μm, 400 to 600 parts by weight of yogurt, 400 to 600 parts by weight of water and 150 to 300 parts by weight of saccharides to provide a mixture; and freezing the mixture in an ice cream freezer, wherein the resultant ice cream has a crude fat content of 2% or less. The low-fat ice cream does not contain powdered skim milk, dried whole milk, an emulsifier, a stabilizer, or the like, added generally to prepare a soft ice cream, but is obtained from natural ingredients only. Thus, repeated intake of the ice cream in a large amount does not cause a greasy taste but provides a soft taste unique to a soft ice cream. In addition, the low-fat ice cream is excellent in taste sense. Further, repeated intake of the ice cream does not cause any harmful effects by virtue of the absence of any processed ingredients.

9 Claims, No Drawings

METHOD FOR PREPARING LOW-FAT ICE CREAM AND A LOW-FAT ICE CREAM PREPARED BY THE METHOD

REFERENCE TO RELATED APPLICATION

This is a continuation of PCT/KR2009/004680, filed Aug. 21, 2009.

CROSS-REFERENCE TO RELATED APPLICATIONS

This application claims priority under 35 U.S.C. §119 to Korea Patent Applications No. 10-2008-0083080, filed on 25 Aug. 2008 and 10-2009-76507 filed on 19 Aug. 2009 in the Korean Intellectual Property Office, the disclosure of which is incorporated herein by reference in its entirety.

TECHNICAL FIELD

The following disclosure relates to a method for preparing a low-fat ice cream and the low-fat ice cream obtained thereby. More particularly, the following disclosure relates to a method for preparing a low-fat ice cream having a significantly decreased fat content due to the absence of powdered milk or the like, as well as to a low-fat ice cream obtained thereby.

BACKGROUND

In general, the term 'ice cream' means a frozen dessert obtained after mixing and homogenizing dairy products, such as milk, with flavoring ingredients. Although ice cream was served classically as a dessert in the West, it is regarded as an item of personal today. Some ice cream having a high nutritional value, particularly ice cream with a high fat content, has a calorie of 200 kcal per 100 g. Ice cream is used not only as a snack or dessert but also as a diet for patients or babies.

It is known that ice cream was designed first in around 1550 in Italy and distributed to many European countries. At that time, ice cream had a large ice crystal size like a today's sherbet. Since the 18$^{th}$ century, ice cream has been made by mixing cream with egg yellow and sweeteners under stirring, followed by freezing, so that it has been allowed to have a fine ice crystal size and a soft taste like a today's ice cream. After that time, concentrated milk, condensed milk or powdered milk has been used in addition to cream, while freezing machines have been developed. Under these circumstances, ice cream has been produced in an industrial scale. A method for preparing such ice cream basically includes mixing milk or other dairy products with saccharides, flavoring agents and other side ingredients; homogenizing, sterilizing, cooling and aging the resultant mixture; and stirring the resultant product to incorporate air thereto, followed by freezing. Broadly, such basic methods are classified into European self-made type methods and American industrial methods. The former includes mangling egg yellow, fresh cream, or the like, sufficiently before freezing and provides a deluxe taste, while the latter is focused on nutritional effects and ice cream as a dairy product and provides ice cream products accessible easily in quantity.

As ice cream has broadened applications in various fields beyond its use as a dessert or snack, many attempts have been made to develop novel ice cream ingredients, processing technologies and mixing technologies. Particularly, since ice cream contains a significant amount of sweeteners and fats to satisfy personal preference, it has high-calorie characteristics due to such an ingredient composition. Thus, such ice cream does not meet modern sense about food intake closely related to health, because it is particularly known that excessive calorie intake results in side effects, including obesity and hyperlipidemia.

To overcome this, many attempts have been made to introduce various, functional materials into ice cream. However, most of such functional materials are not suitable in terms of ice cream properties with which a high personal preference is accomplished, since they are not amenable to micronization of ice cream ingredients, homogeneous and stable mixing and sufficient foaming. Although liquid functional extract has been used to accomplish homogeneous and stable mixing, such extracts frequently affect a flavor of ice cream, thereby causing ice cream to lose its value as a personal item. Under these circumstances, many attempts have been made to develop ingredients and processes capable of solving the problems of high calorie of milk fats and a greasy taste thereof while not adversely affecting the preference to ice cream itself. As a part of such attempts, some processes of substituting milk fats used in ice cream with cereal starch, particularly with rice or unpolished rice have been provided.

In terms of nutrition, rice contains various nutrients, including carbohydrates, proteins, lipids, minerals and vitamins. Although rice has a protein content of 6% to 7%, which is lower than that of wheat, it is regarded as a high-quality protein source like soybeans. In addition, rice contains Vitamin B, Vitamin E, dietary fibers, phosphorous, magnesium, etc. Carbohydrates in rice occupy the highest proportion and are substantially composed of starch. As minerals, rice contains a relatively large amount of phosphorus and a relatively small amount of calcium. Therefore, it can be seen that rice is sufficient to substitute for fat ingredients, and is a high-quality food having a good balance of nutrients.

Further, rice starch is suitable for preparation of ice cream, as compared to other ingredients. Particularly, rice starch is advantageous in that it does not affect main characteristics of ice cream, such as a chewing taste or soft texture of ice cream. Rice flour, particularly starch as a main ingredient of rice flour, having such properties has been used to prepare ice cream according to the related art. For example, Korean Unexamined Patent Publication No. 1993-0022962 discloses a method for preparing a rice ice cream. The method includes: pulverizing rice to rice flour having an average particle diameter of 50 μm to 300 μm; dipping the rice flour into water and/or milk at room temperature to allow swelling of rice flour; heating and boiling the resultant solution in which the rice flour is swelled and dipped to obtain a homogeneous rice paste; and mixing the rice paste obtained right after the preceding operation with a homogeneous powdery mixture containing a sweetening agent and milk to provide a homogeneous ice cream mix.

The above-mentioned method has some advantages in that it dose not require the use of a stabilizer, sterilization operation and homogenization operation. However, the method is problematic in that the ice cream mix has an increased viscosity as the starch ingredient (i.e., rice) undergoes gelatinization, resulting in degradation of homogeneity during the preparation of mix, thereby adversely affecting the texture of a frozen ice cream.

In addition, Korean Patent Publication Nos. 0489927, 0489928 and 0489929 disclose a method for forming an ice cream from an ice cream mix obtained by mixing and homogenizing rice slurry formed by adding alpha-amylase to rice flour, sugar, starch syrup, milk cream, powdered skim milk, a stabilizer, fruit concentrate and water. It is stated that the method provides an improved texture of ice cream upon eating by decreasing the viscosity of gelatinized starch particles through the addition of alpha-amylase to rice.

Meanwhile, Korean Unexamined Patent Publication No. 2004-0081728 discloses a method for preparing an ice cream containing polished rice or black rice. The method includes pulverizing polished rice or black rice by a pulverizer, boiling the pulverized rice after mixing it with milk in a cooking pot; and mixing the cooked rice with a mixed base to provide ice cream.

All of the above-mentioned methods according to the related art are based on a decrease in viscosity of starch particles through the use of amylase, and on improvement of texture of ice cream upon eating. However, they are problematic in terms of a harmony between rice and milk fats and ice cream hardness.

In conclusion, although ice cream containing rice substituting for milk fat is slightly advantageous in terms of nutritional effects, as compared to ice cream essentially containing milk fats, it still uses powdered skim milk, dried whole milk, emulsifiers, etc. Therefore, such ice cream still has a high crude fat content, thereby adversely affecting an ice cream taste. Furthermore, repeated intake of such ice cream causes an increase in fat intake in vivo.

SUMMARY

An embodiment of the present disclosure is directed to providing a low-fat ice cream using rice starch and having a significantly decreased crude fat content by using no dried whole milk and powdered skim milk.

Another embodiment of the present disclosure is directed to providing a low-fat ice cream using rice starch and having a significantly decreased milk fat content by adding a pumpkin or fruit.

Still another embodiment of the present disclosure is directed to providing a low-fat ice cream obtained by the above-described methods.

In one general aspect, there is provided a method for preparing a low-fat ice cream, including:

mixing 100 parts by weight of boiled rice obtained by gelatinizing rice, 400 to 600 parts by weight of yogurt, 400 to 600 parts by weight of water and 150 to 300 parts by weight of saccharides to provide a mixture; and freezing the mixture in an ice cream freezer, wherein the resultant ice cream has a crude fat content of 2% or less.

In another general aspect, there is provided a method for preparing a low-fat ice cream, including:

mixing 100 parts by weight of boiled rice obtained by gelatinizing rice, 500 to 700 parts by weight of yogurt, 500 to 700 parts by weight of water, 250 to 400 parts by weight of saccharides and 200 to 500 parts by weight of a pumpkin to provide a mixture; and freezing the mixture in an ice cream freezer, wherein the resultant ice cream has a crude fat content of 2% or less.

In still another general aspect, there is provided a method for preparing a low-fat ice cream, including:

mixing 100 parts by weight of boiled rice obtained by gelatinizing rice, 500 to 700 parts by weight of water, 250 to 400 parts by weight of saccharides and 100 to 500 parts by weight of a fruit to provide a mixture; and freezing the mixture in an ice cream freezer, wherein the resultant ice cream has a crude fat content of 2% or less.

In yet another general aspect, there is provided a low-fat ice cream obtained by the above-mentioned methods.

The low-fat ice cream disclosed herein dose not include powdered skim milk, dried whole milk, milk cream, a stabilizer, or the like, which, otherwise is added generally to prepare a soft ice cream, but is prepared by using natural ingredients only. Therefore, repeated intake of the low-fat ice cream in a large amount causes no greasy taste and provides a soft taste unique to soft ice cream. In addition to such a good taste, the low-fat ice cream disclosed herein is not harmful to the human body even in the case of repeated intake, by virtue of the absence of processed ingredients.

Other features and aspects will be apparent from the following detailed description and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

In one aspect, the method for preparing a low-fat ice cream includes:

mixing 100 parts by weight of boiled rice obtained by gelatinizing rice, 400 to 600 parts by weight of yogurt, 400 to 600 parts by weight of water and 150 to 300 parts by weight of saccharides to provide a mixture; and freezing the mixture in an ice cream freezer, wherein the resultant ice cream has a crude fat content of 2% or less.

First, to obtain boiled rice by gelatinizing rice, rice is dipped and swelled in water. Then, the swelled rice or unpolished rice is dewatered and cooked with water steam. After the cooking, the rice or unpolished rice is dried to a water content of 10 to 30 wt % and pulverized to a size of 320 to 350 µm by using a hammer mill.

Yogurt contains, in addition to nutrients of milk, lactic acid produced by lactic acid fermentation, peptone, peptide and lactic acid bacteria, and thus is better than milk in terms of nutrition. In the low-fat ice cream disclosed herein, a paste-like yogurt having a high milk solid content and a large number of lactic acid bacteria may be used. This is because a gel-like soft texture of such paste-like yogurts is favorable to the resultant ice cream texture.

Saccharides used herein may include monosaccharides, disaccyarides, oligosaccharides or polysaccharides.

Monosaccharides are carbohydrates having a simple structure that does not allow hydrolysis with acids, alkalis or enzymes any longer, and particular examples thereof include glucose, fructose and galactose.

Diacchariades have two constitutional units, each unit forming a monosaccharide. Particular examples of disaccharides include sugar, maltose and lactose.

Oligosaccharides have at least three to five or six monosaccharides and form glycoproteins and glycolipids.

Polysaccharides are energy storage forms or are materials forming a plant structure, and are hydrolyzed into a large number of monosaccharides. Particular examples of polysaccharides include starch, glycogen, and dietary fibers.

Based on 100 parts by weight of gelatinized rice, 400 to 600 parts by weight of yogurt and 400 to 600 parts by weight of water are mixed gradually. Then, 150 to 300 parts by weight of saccharides are further added to form a mixture. The saccharides may be mixed with boiled rice, yogurt and water, or with a preliminarily formed mixture of boiled rice, yogurt and water.

After the mixing, the mixture may be optionally subjected to sterilization, cooling and aging. Such sterilization, cooling and aging operations are used individually in a selective manner if required in a process for preparing a low-fat ice cream. More particularly, the mixture may be sterilized at 70 to 80° C. for 10 to 20 minutes, cooled to 2 to 5° C., and aged for 2 to 4 hours. The aging operation allows the ingredients of the ice cream mixture to be mixed with each other sufficiently.

The ice cream mixture is frozen in an ice cream freezer at a temperature of about −10° C. to −7° C. to provide ice cream. The ice cream may be introduced into a shaping machine to be formed into a desired shape.

The method disclosed herein is characterized in that it dose not use powdered skim milk, dried whole milk, an emulsifier, a stabilizer and a coloring agent, which, otherwise are added during the known processes for preparing ice cream.

In general, ice cream according to the related art uses powdered skim milk or dried whole milk to provide a soft taste of a soft ice cream. However, excessive use of powdered milk causes an increase in crude fat content of ice cream, and thus repeated intake of such ice cream causes a greasy taste and fat intake. The use of powdered skim milk or dried whole milk has been regarded as an essential element for preparing a soft ice cream. However, the method disclosed herein is capable of realizing a soft texture and taste of a soft ice cream while reducing the crude fat content to 2% or less by using no powdered skim milk or dried whole milk. Due to such a low crude fat content of 2% or less, repeated intake of the low-fat ice cream disclosed herein causes no greasy taste and reduces in vivo fat intake. Therefore, it is thought that the low-fat ice cream disclosed herein is a wellbeing food for humans today.

Ice cream known to date contains an emulsifier, such as glycerin, fatty acids, esters, sodium caseinate or lecithin. Such emulsifiers have been used not only for ice cream but also for margarine, shortening, cakes, caramels, gums, chocolates, biscuits, bean curd, butter, cookies, crackers, yogurt, coffee mix, etc. Emulsifiers are used to mix some ingredients, which, otherwise, are not easily miscible with each other. Particularly, emulsifiers cause cocoa powder to be dissolved easily in water and to retain water content. On the other hand, such emulsifiers serve to accelerate intake of harmful chemicals, such as carcinogens, into the body fluid. According to a study, emulsifiers may cause skin disorders, intestinal cell destruction, liver damages, or the like.

While making ice cream, air injection is carried out upon freezing a mixture of milk, cream, powdered milk, sugar, etc. The resultant ice cream has a softness varied with the amount of air injection. However, to prevent ice cream from thawing and flowing down rapidly, stabilizers are added to allow ice cream to maintain adequate glutinous property and integrity. Like emulsifiers, stabilizers may serve to assist intake of harmful chemicals or to inhibit intake of nutrients.

As described above, the low-fat ice cream disclosed herein uses no emulsifiers and stabilizers, and thus causes no problems related to food safety. Therefore, the low-fat ice cream may be served repeatedly without any concerns.

In another aspect, the method for preparing a low-fat ice cream includes:

mixing 100 parts by weight of boiled rice obtained by gelatinizing rice or unpolished rice, 500 to 700 parts by weight of yogurt, 500 to 700 parts by weight of water, 250 to 400 parts by weight of saccharides and 200 to 500 parts by weight of a pumpkin to provide a mixture; and freezing the mixture in an ice cream freezer.

Pumpkins are abundant in Vitamin A, carotene and have a function of protecting the gastric mucous membrane and treating a stomachache. According to an illustrated galenical book, it is stated that "a pumpkin strengthens one's stomach to add energy" and it is known that a pumpkin is effective as a diuretic agent and treats neuralgia, a burn, diabetes, night blindness and dried cornea. The addition of a pumpkin to the ice cream disclosed herein makes the ice cream abundant in carotene and vitamins. Thus, it is possible to provide a low-fat ice cream favorable to invigoration.

The other operations for preparing ice cream may be carried out in the same manner as described above.

In still another aspect, the method for preparing a low-fat ice cream includes:

mixing 100 parts by weight of boiled rice obtained by gelatinizing rice or unpolished rice, 500 to 700 parts by weight of water and 100 to 500 parts by weight of a fruit to provide a mixture; and freezing the mixture in an ice cream freezer.

The fruit that may be used herein is at least one selected from the group consisting of melons, strawberries, pineapples, bananas, watermelons, tomatoes, apples, pears, persimmons, plums, peaches and oriental melons. The addition of a fruit reduces or avoids addition of saccharides. The amount of fruit addition is determined by the sugar content of the selected fruit. Thus, addition of a fruit may be selected suitably depending on the fruit kind, breed and harvest time. In addition, when adding a fruit, addition of yogurt may be eliminated or a predetermined amount of yogurt may be added.

The ice cream disclosed herein may further include a bulbous plant, such as a potato, sweet potato or onion, or a leguminous plant, such as a kidney bean, pea or black bean. The other operations for preparing ice cream may be carried out in the same manner as described above.

The low-fat ice cream obtained by the method disclosed herein does not use powdered skim milk, dried whole milk, milk cream, stabilizers, etc., which, otherwise, are added to prepare a soft ice cream according to the related art, but contain natural ingredients only. Therefore, repeated intake of the ice cream disclosed herein causes no greasy taste while providing a soft taste unique to a soft ice cream.

EXAMPLES

The examples and experiments will now be described. The following examples and experiments are for illustrative purposes only and not intended to limit the scope of this disclosure.

Example 1

First, 25 kg of rice is swelled in 10 L of water for hours and the swelled rice is dewatered. Next, the dewatered rice is boiled by cooking it in an autoclave at 120° C. under 1.2 atm for 15 minutes to provide boiled rice. Then, the boiled rice is dried to a water content of 20 wt %. The dried boiled rice is pulverized to a size of 320 to 350 µm by using a hammer mill.

To 400 g of the pulverized boiled rice, 2000 g of yogurt and 2000 g of water are added and mixed with agitation. Then, 880 g of sugar is mixed therewith. The resultant mixture is frozen in an ice cream freezer (available from Taylor, Co.) to −8° C., thereby providing a low-fat ice cream.

Example 2

Example 1 is repeated except that 900 g of sweet potato, 2000 g of yogurt, 780 g of sugar and 1000 g of water are mixed and agitated.

Example 3

Example 1 is repeated except that 250 g of boiled rice, 1500 g of yogurt, 850 g of a pumpkin and 1500 g of water are mixed and agitated, and that 800 g of sugar is further introduced to the mixture.

Comparative Example 1

A commercially available ice cream "Excellent™" (Binggrae, Korea) is used. The ice cream of Comparative Example 1 contains, as ingredients, concentrated milk, milk cream, white sugar, purified water, fructo-oligosaccharide, sweetened egg yellow, an emulsifier, a thickening agent, guar gum, locust bean gum, carrageenan, tamarind gum, purified salt, vanillin, synthetic colorants (vanilla fragrance), and a mixed formulation (betacarotene, glycerin, an emulsifier, Vitamin A).

Comparative Example 2

A commercially available ice cream "Natuur™" (Lotte Confectionary Co., Ltd., Korea) is used. The ice cream of Comparative Example 2 contains, as ingredients, water, milk cream, defatted concentrated milk, raspberry syrup (raspberry, white sugar, starch syrup, liquid fructose, pectin), white sugar, cheese cake (cream cheese, white sugar, whole egg, wheat flour, corn syrup), egg yellow and cheese powder.

Results and Evaluation

Examples 1-3 and Comparative Examples 1-2 are subjected to component analysis. The results of the component analysis conducted in Korea Food Research Institute are shown in the following Tables 1 and 2.

TABLE 1

|  | Ex. 1 | Ex. 2 | Ex. 3 |
| --- | --- | --- | --- |
| Water content (%) | 81.0 | 71.6 | 70.8 |
| Crude Protein (%) | 1.6 | 1.5 | 1.5 |
| Crude Fat (%) | 1.7 | 2.0 | 1.2 |
| Ash (%) | 0.3 | 0.4 | 2.0 |
| Carbohydrate (%) | 15.4 | 24.5 | 24.5 |
| Calorie (kcal) | 83.3 | 122 | 114.8 |

TABLE 2

|  | Comp. Ex. 1 | Comp. Ex. 2 |
| --- | --- | --- |
| Water content (%) | 59.9 | 36.8 |
| Crude Protein (%) | 2.0 | 4.2 |
| Crude Fat (%) | 14.0 | 18.9 |
| Ash (%) | 0.1 | 0.1 |
| Carbohydrate (%) | 24.0 | 40.0 |
| Calorie (kcal) | 135 | 145 |

Referring to Table 1, Examples 1-3 (inventive) have a crude fat content of 1.2% to 2.0%. Referring to Table 2, Comparative Examples 1 and 2 have a crude fat content of 14% to 18.9%.

The low-fat ice cream disclosed herein does not use powdered skim milk, dried whole milk, an emulsifier, a stabilizer, or the like, but is obtained from natural ingredients only. This makes the ice cream disclosed herein excellent in taste sense. In addition, the low-fat ice cream disclosed herein has no processed ingredients and shows a low fat content, so that repeated intake of the ice cream does not cause any harmful effects. Therefore, it is expected that the low-fat ice cream disclosed herein serves as a well-being food.

While the present disclosure has been described with respect to the specific embodiments, it will be apparent to those skilled in the art that various changes and modifications may be made without departing from the spirit and scope of the present disclosure as defined in the following claims.

What is claimed is:

1. A method for preparing a low-fat ice cream which is free of emulsifier, stabilizer and any milk or milk product other than yogurt, comprising:
    mixing 100 parts by weight of boiled rice obtained by gelatinizing rice, drying the gelatinized rice to a water content of 20 wt % or less and pulverizing the dried rice to an average particle diameter of 320 to 350 µm, 400 to 600 parts by weight of yogurt, 400 to 600 parts by weight of water and 150 to 300 parts by weight of saccharides to provide a mixture; and
    freezing the mixture in an ice cream freezer at a temperature in the range of −10° C. to −7° C., wherein the resultant ice cream has a crude fat content of 2% or less due to the absence of a milk or milk product other than yogurt, and wherein the low fat ice cream product made by said process has a non-greasy taste and a soft texture of a soft serve ice cream.

2. The method for preparing a low-fat ice cream according to claim 1, wherein the saccharides comprise monosaccharides, disaccharides or polysaccharides.

3. The method for preparing a low-fat ice cream according to claim 1, which further comprises either or both of sterilizing and aging the mixture, after providing the mixture.

4. A method for preparing a low-fat ice cream which is free of emulsifier, stabilizer and any milk or milk product other than yogurt, comprising:
    mixing 100 parts by weight of boiled rice obtained by gelatinizing rice, drying the gelatinized rice to a water content of 20 wt % or less and pulverizing the dried rice to an average particle diameter of 320 to 350 µm, 500 to 700 parts by weight of yogurt, 500 to 700 parts by weight of water, 250 to 400 parts by weight of saccharides and 200 to 500 parts by weight of a pumpkin to provide a mixture;
    and freezing the mixture in an ice cream freezer at a temperature in the range of −10° C. to −7° C., wherein the resultant ice cream has a crude fat content of 2% or less due to the absence of a milk or milk product other than yogurt, and wherein the low fat ice cream product made by said process has a non-greasy taste and a soft texture of a soft serve ice cream.

5. The method for preparing a low-fat ice cream according to claim 4, wherein the saccharides comprise monosaccharides, disaccharides or polysaccharides.

6. A method for preparing a low-fat ice cream which is free of any milk or milk product other than yogurt, comprising:

mixing with yogurt 100 parts by weight of boiled rice obtained by gelatinizing rice, drying the gelatinized rice to a water content of 20 wt % or less and pulverizing the dried rice to an average particle diameter of 320 to 350 μm, 500 to 700 parts by weight of water, 250 to 400 parts by weight of saccharides and 100 to 500 parts by weight of a fruit to provide a mixture;

and freezing the mixture in an ice cream freezer at a temperature in the range of −10° C. to −7° C., wherein the resultant ice cream has a crude fat content of 2% or less due to the absence of a milk or milk product other than yogurt, and wherein the low fat ice cream product made by said process has a non-greasy taste and a soft texture of a soft serve ice cream.

7. The method for preparing a low-fat ice cream according to claim 6, wherein the fruit is at least one selected from the group consisting of melons, strawberries, pineapples, bananas, watermelons, tomatoes, apples, pears, persimmons, plums, peaches and oriental melons.

8. The method for preparing a low-fat ice cream according to claim 6, wherein the saccharides comprise monosaccharides, disaccharides or polysaccharides.

9. A low-fat ice cream obtained by the method as defined in any one of claims 1 to 8.

\* \* \* \* \*